United States Patent [19]

Shaw

[11] Patent Number: 5,115,598
[45] Date of Patent: May 26, 1992

[54] STRUCTURE OF FISHING ROD STAND FOR FISHING ON THE SEA

[76] Inventor: Chi S. Shaw, 3th Floor, No. 16, Fu Hsing Road, Chung Ho City, Taipei Hsien, Taiwan

[21] Appl. No.: 642,731
[22] Filed: Jan. 16, 1991
[51] Int. Cl.$^5$ ............................................. A01K 97/10
[52] U.S. Cl. .................................... 43/21.2; 248/538
[58] Field of Search ............... 43/21.2; 248/538, 536, 248/534

[56] References Cited

U.S. PATENT DOCUMENTS

| | | | |
|---|---|---|---|
| 2,606,731 | 8/1952 | Harris | 43/21.2 |
| 3,532,309 | 10/1970 | Reddick | 248/512 |
| 3,927,487 | 12/1975 | Miyamae | 43/21.2 |
| 4,425,729 | 1/1984 | Miyamae | 43/21.2 |
| 4,641,453 | 2/1987 | Roberts | 43/21.2 |
| 4,916,847 | 4/1990 | Rusgo | 43/21.2 |

Primary Examiner—Richard K. Seidel
Assistant Examiner—Chuck Y. Mah
Attorney, Agent, or Firm—Lowe, Price, LeBlanc & Becker

[57] ABSTRACT

Disclosed herein is a new structure of fishing rod stand for fishing on the sea which is designed by taking the distance between fisherman's seat and fishing rod stand and the need of control into consideration. It has a link of considerable length with an adjustable rack assembly connected to the front end so that it can be fixed to the hull rapidly without any tool and the link can be adjusted to an appropriate position in order to place a rod adjuster assembly connecting to another end of the link to the most convenient position for control, eliminate the need of changing fisherman's seat or leaning of fisherman's body to control the fishing rod. Moreover, the rod adjuster assembly permits changing of fishing line direction to adapt with current flow direction in order to prevent from breakage of line under adverse trailing force of the sea current, and permits rapid adjustment on fishing rod direction as well as exchange of a V-channel for different fishing rod or use of auxiliary fishing tackle for the best possible fun from fishing.

3 Claims, 9 Drawing Sheets

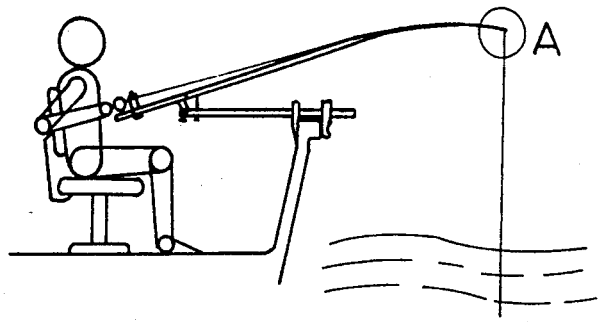
FIG. 1-B
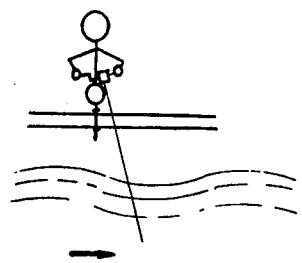
FIG. 1-E
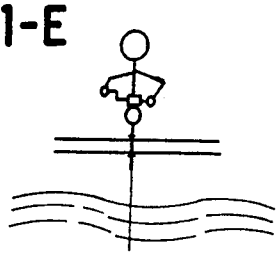
FIG. 1-F
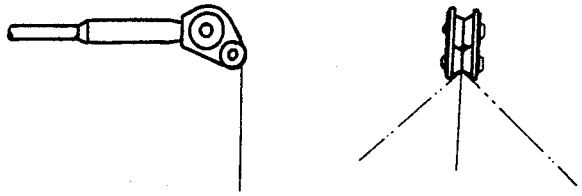
FIG. 1-A
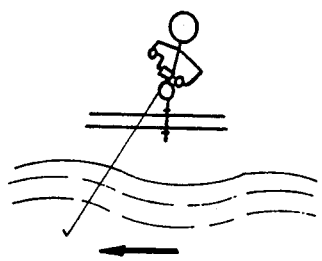
FIG. 1-G
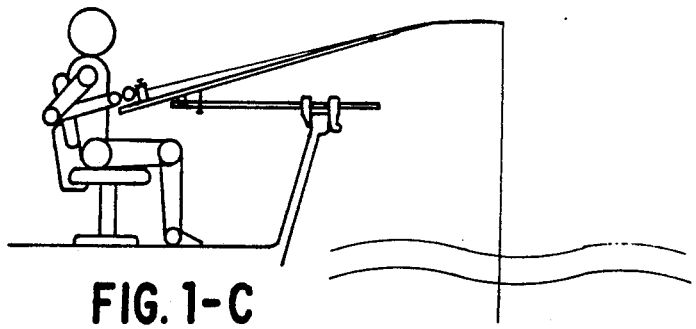
FIG. 1-C
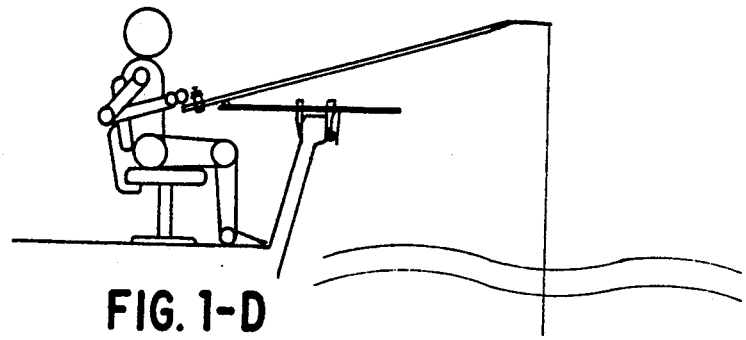
FIG. 1-D

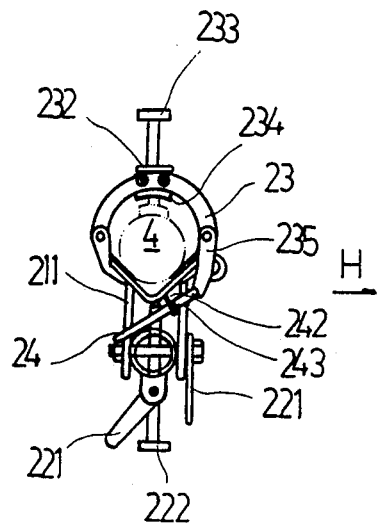
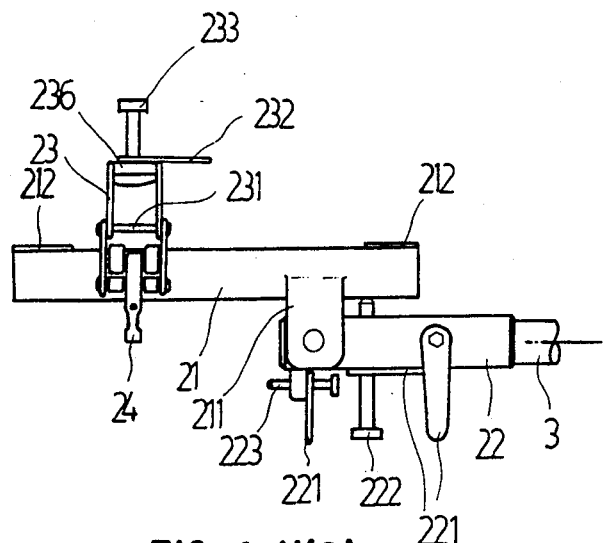
FIG. 4-H(1)     FIG. 4-H(2)
FIG. 5
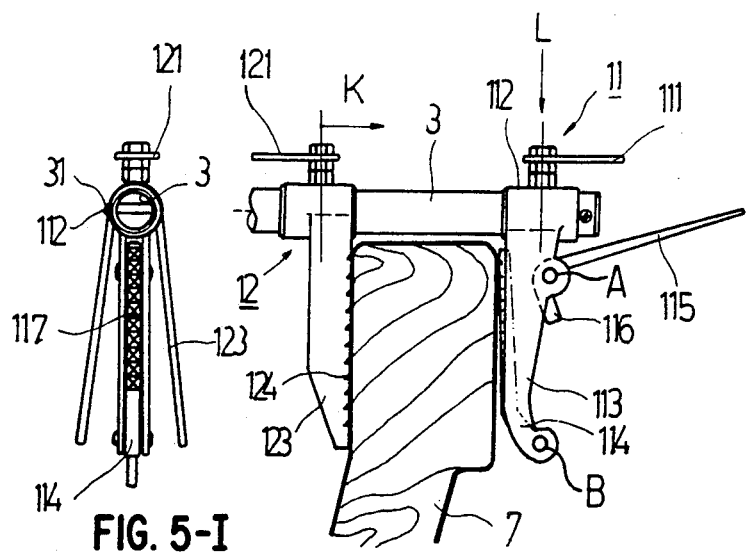
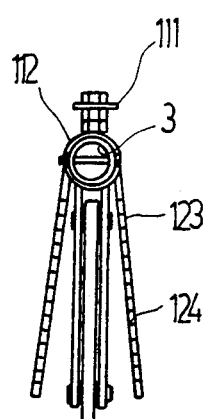
FIG. 5-I
FIG. 5-J
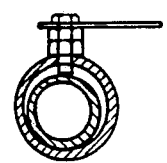
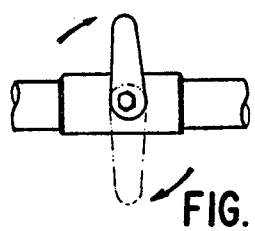
FIG. 5-K     FIG. 5-L

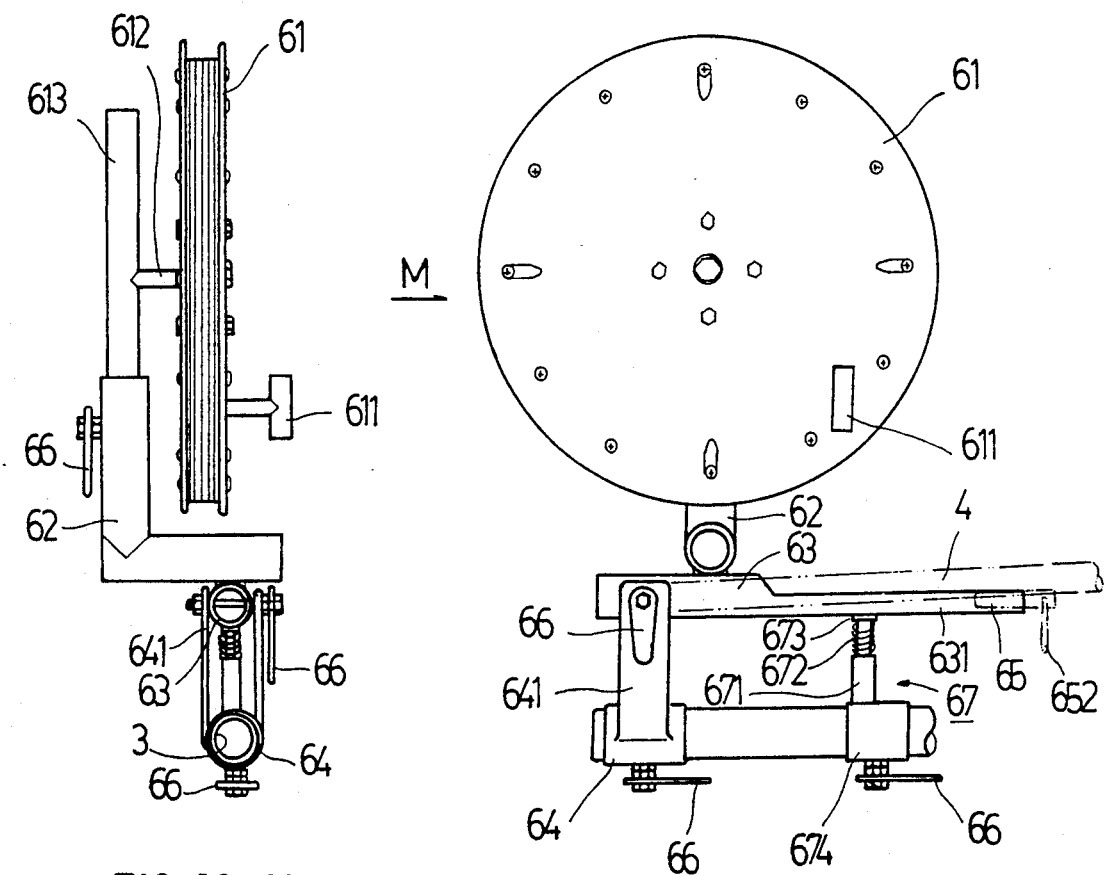

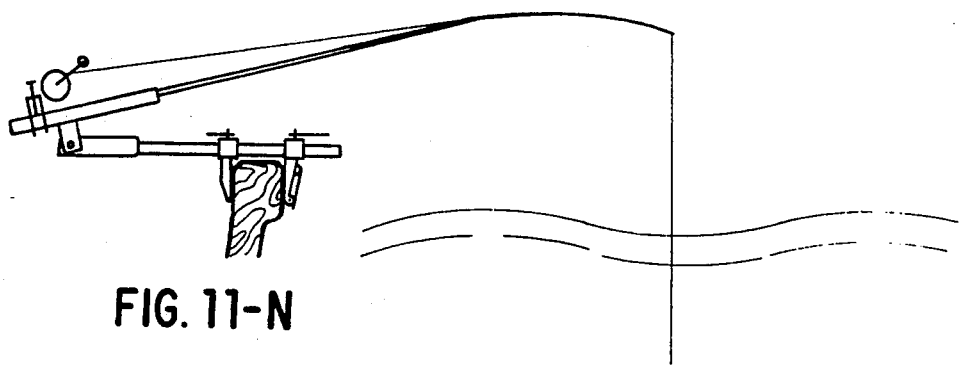
FIG. 11-N
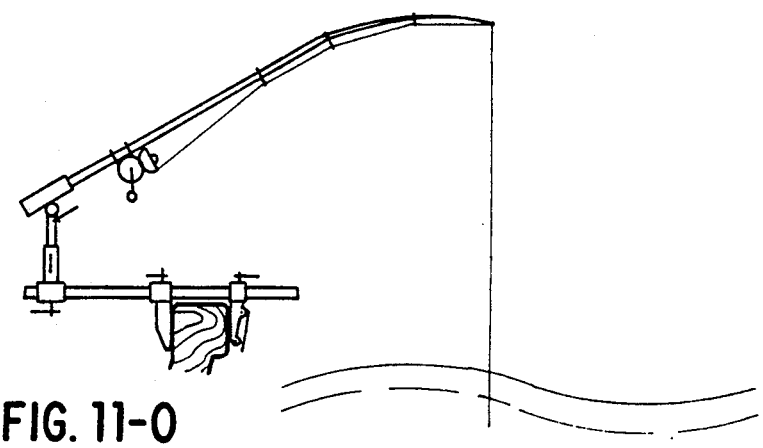
FIG. 11-O
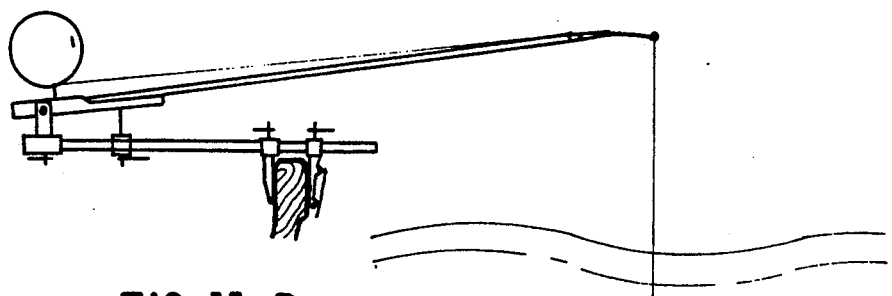
FIG. 11-P

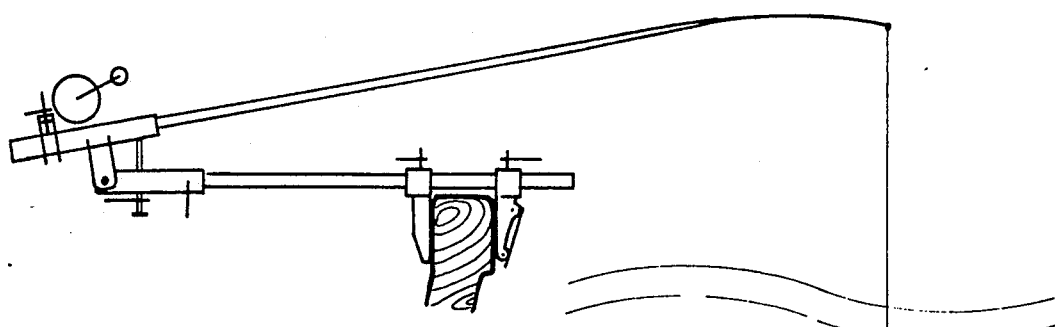
FIG. 12-Q
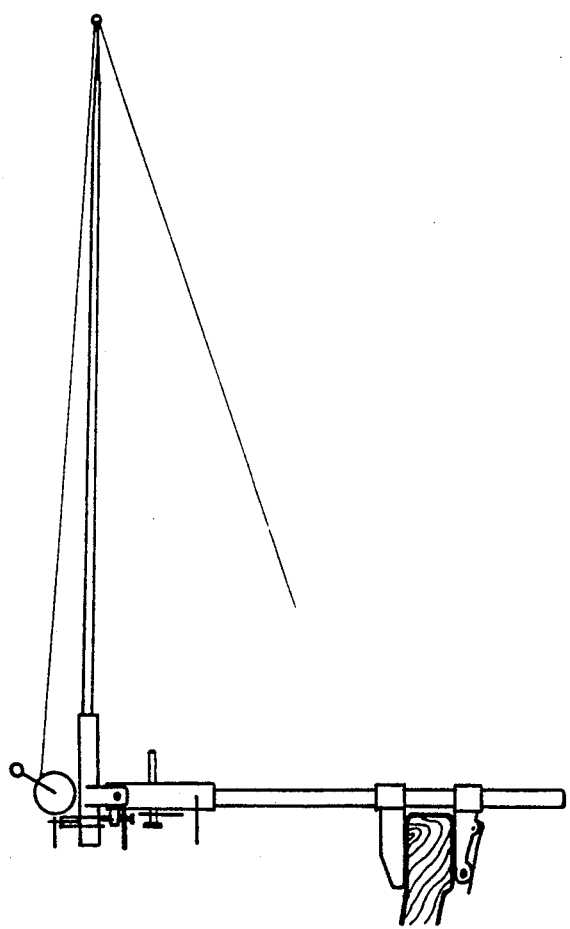
FIG. 12-R

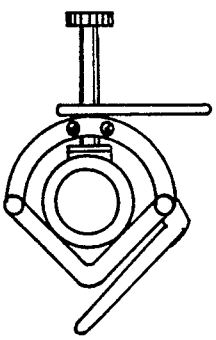
FIG. 13-S(1)
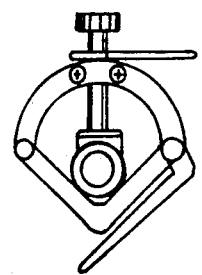
FIG. 13-S(2)
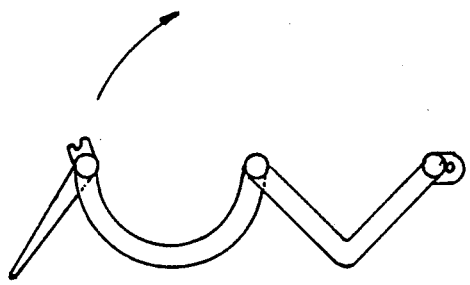
FIG. 13-T(1)
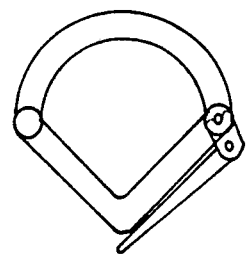
FIG. 13-T(2)
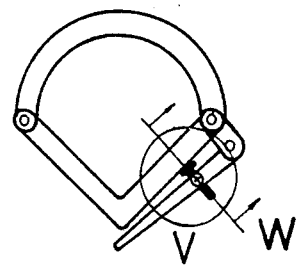
FIG. 13-U
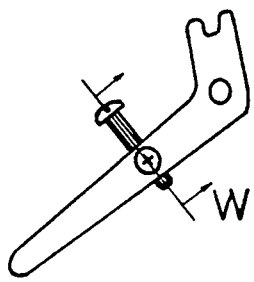
FIG. 13-V
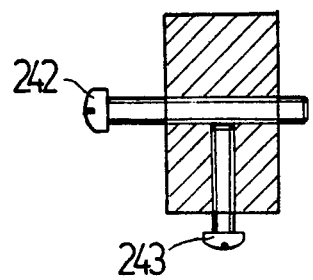
FIG. 13-W

STRUCTURE OF FISHING ROD STAND FOR FISHING ON THE SEA

BACKGROUND OF THE INVENTION

In addition to selection of a right fishing rod, holding of fishing rod is essential to fishing, particularly while fishing on the sea, where fishing rod is usually held by a stand to ease control. Conventionally wrench or vice plier is used to install fishing rod stand on side of hull, and such kind of fishing rod stand is simply for fixing of a fishing rod, and does not fisherman to get control of it effectively, the fisherman has to bow his body before he can control the fishing rod, particularly during fishing on the sea where sea current is usually very strong which is risky for fishing and restricts him from standing beside the side of hull.

Furthermore, strong current flow always breaks fishing rod or fishing line because of sudden turning. Therefore, upon sailing of fishing boat, the fishing rod must be withdrawn to assure safety and to prevent from deviation because of wind resistance. However, with the conventional fishing rod stand, withdrawal of fishing rod is a time and effort consuming job.

In view of the above defects, with his rich experience in fishing, and upon repeated researches and experiments, the inventor has successfully created a new structure of fishing rod stand which is easy to install and operation, permit easy control of fishing rod and fishing line direction, and extend service life of fishing rod.

SUMMARY OF THE INVENTION

The main objective of the present invention is to provide a new structure of fishing rod stand for fishing on the sea which is easy to install and operation, permit easy control of fishing rod and fishing line direction, and extend service life of fishing rod.

Another objective of the present invention is to provide a new structure of fishing rod stand for fishing on the sea which includes a link connecting to a rack assembly at the front end comprising a front adjuster and a back adjuster to permit adjustment of its position and permit installation by means of a puller which is an integrated part of the rack assembly without using of any tool.

Another objective of the present invention is to provide a new structure of fishing rod stand for fishing on the sea which includes a rack assembly to be fixed to hull and a link with connecting the rack assembly and a rod adjuster assembly so that the rod adjuster assembly can be adjusted and placed in the most appropriate location for control of fishing rod by the fisherman, and completely eliminate the need of bowing the fisherman's body as required by the prior art.

Another objective of the present invention is to provide a new structure of fishing rod stand for fishing on the sea which permits instant control on the direction of the fishing rod to adapt with sea current flow in order to protect the fishing line from breaking by trailing from the sea current.

Another objective of the present invention is to provide a new structure of fishing rod stand for fishing on the sea to permit use of ordinary fishing rod and auxiliary fishing tackle with trailing wheel.

In general, the present invention is a novel structure of fishing rod stand particularly for fishing on the sea and permit easy control of fishing rod position, fishing line direction, and withdrawing of the fishing rod to vertical position. It has a link of considerable length with an adjustable rack assembly connected to the front end so that it can be fixed to the hull rapidly without any tool and the link can be adjusted to an appropriate position in order to place a rod adjuster assembly connecting to another end of the link to the most convenient position for control, eliminate the need of changing fisherman's seat or leaning of fisherman's body to control the fishing rod. Moreover, the rod adjuster assembly permits changing of fishing line direction to adapt with current flow direction in order to prevent from breakage of line under adverse trailing force of the sea current, and permits rapid adjustment on fishing rod direction as well as exchange of a V-channel for different fishing rod or use of auxiliary fishing tackle for the best possible fun from fishing and the longest service life of the fishing rod.

BRIEF DESCRIPTION OF THE DRAWINGS

FIG. 1A-G illustrates operation of a preferred embodiment according to the present invention.

FIG. 4H(1) is an in view of the rod adjuster assembly according to the present invention.

FIG. H(2) is a side view of the adjuster assembly of FIG. 4H(1).

FIG. 5 is a side view of the rack assembly according to the present invention.

FIG. 5I is a left side view of the assembly of FIG. 5.

FIG. 5J is a right side view of the assembly of FIG. 5.

FIG. 5K is a cross-sectional view taken along line K of FIG. 5.

FIG. 5L is a top view of the assembly portion shown in FIG. 5K.

Figure 6:
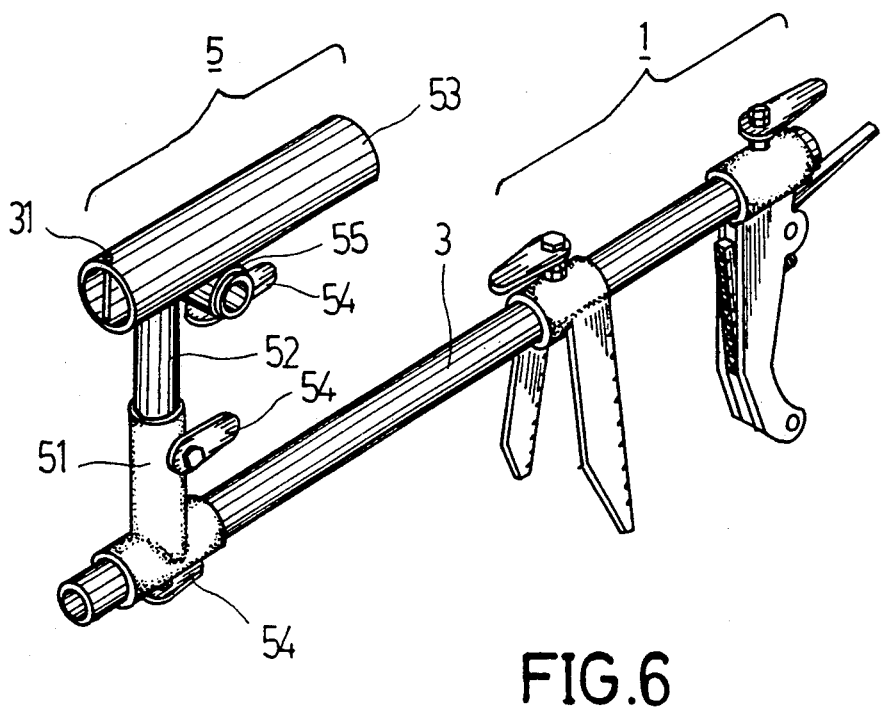

FIG. 6 shows another embodiment of the present invention for use with auxiliary fishing tackle.

Figure 7:
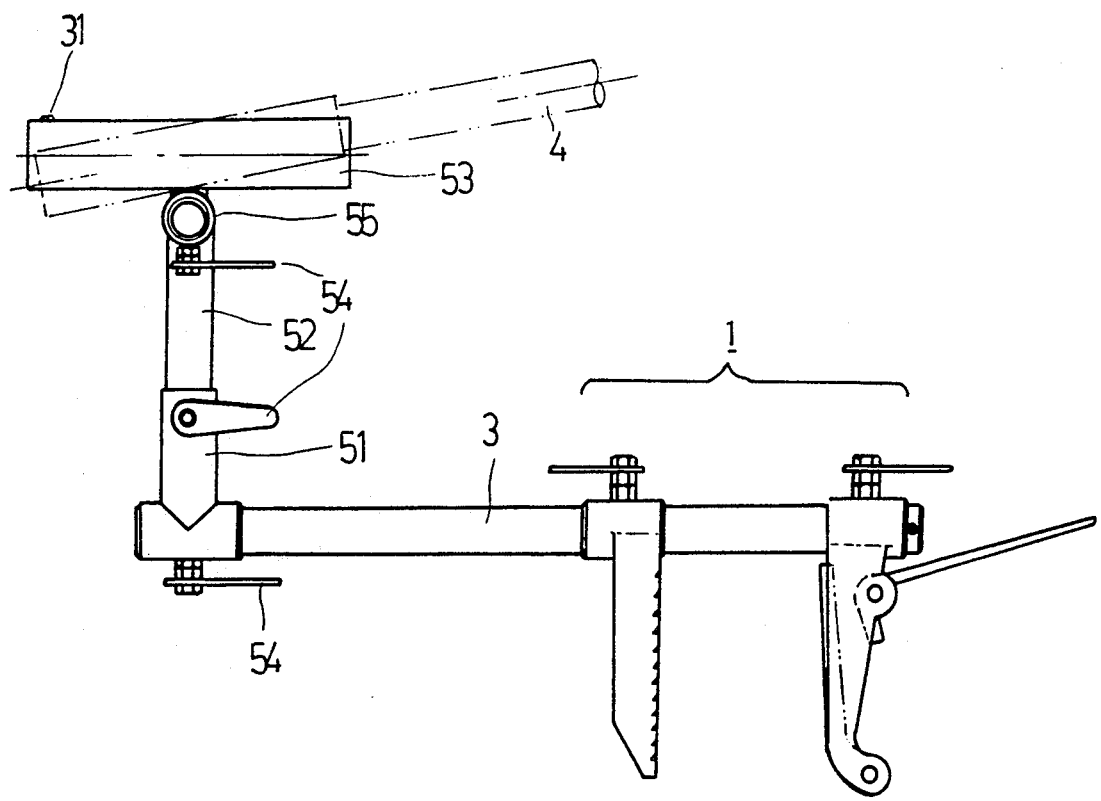

FIG. 7 is a plan of the embodiment shown in FIG. 6.

Figure 8:
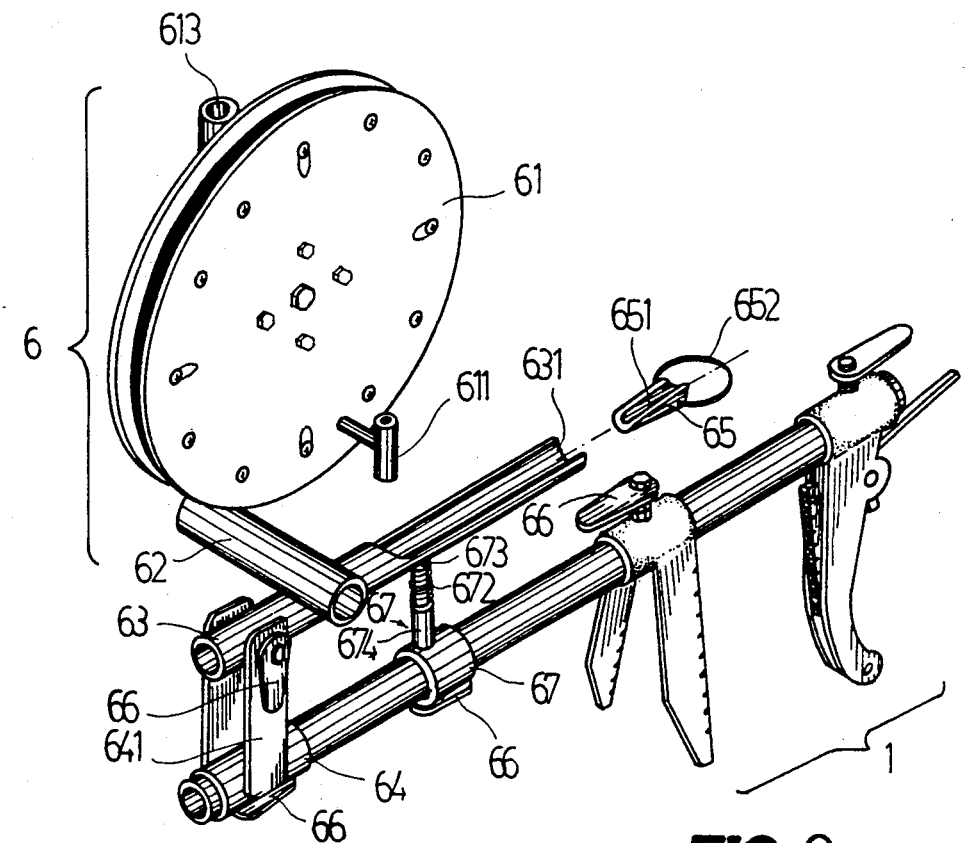

FIG. 8 shown another embodiment of the present invention for use for fishing rod support.

Figure 9:
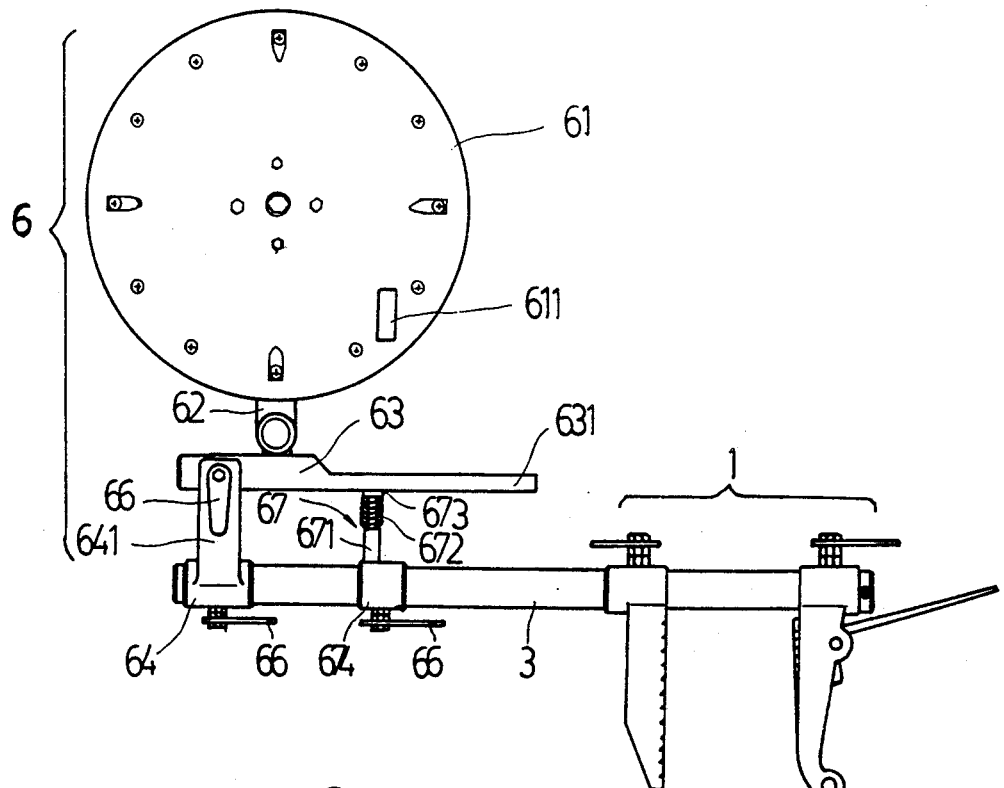

FIG. 9 is a plan illustrating assembly of the embodiment shown in FIG. 8.

FIG. 10 illustrates a side view of the embodiment shown in FIG. 8, in use.

FIG. 10M is a side view of the assembly of FIG. 10.

FIGS. 11N-P illustrate the exchangeable rod adjuster assembly according to the present invention.

FIGS. 12Q and 12R illustrate operation of the embodiment of the present invention.

FIGS. 13S(1) and 13S(2) illustrate the structure of the locker ring according to the present invention.

FIGS. 13T(1) and 13T(2) illustrate the ring in the open and closed position.

FIG. 13U illustrates the ring with adjusting screws.

FIG. 13V is a fragmentary view enlarged of the area "V" in FIG. 13U.

FIG. 13W is a cross-sectional view taken along line W of FIGS. 13U and 13V.

DETAILED DESCRIPTION OF THE PREFERRED EMBODIMENTS

The fishing rod stand according to the present invention allows adjustment of fishing rod to the most comfortable position according to fisherman's need. As shown in FIG. 1, the fishing rod can be adjusted to follow current direction so that its fishing line can be drawn by the current and will not be broken by the fishing rod because of sudden turning (as shown by A in FIG. 1). The structure of the fishing rod stand according to the present invention is easy to operate, fast responsive, and easy to install and disassemble. It is a perfect design of fishing rod stand particularly for fishing on the sea.

The main functions and the components of the fishing rod stand are described below with reference to the attached drawings.

Figure 2:
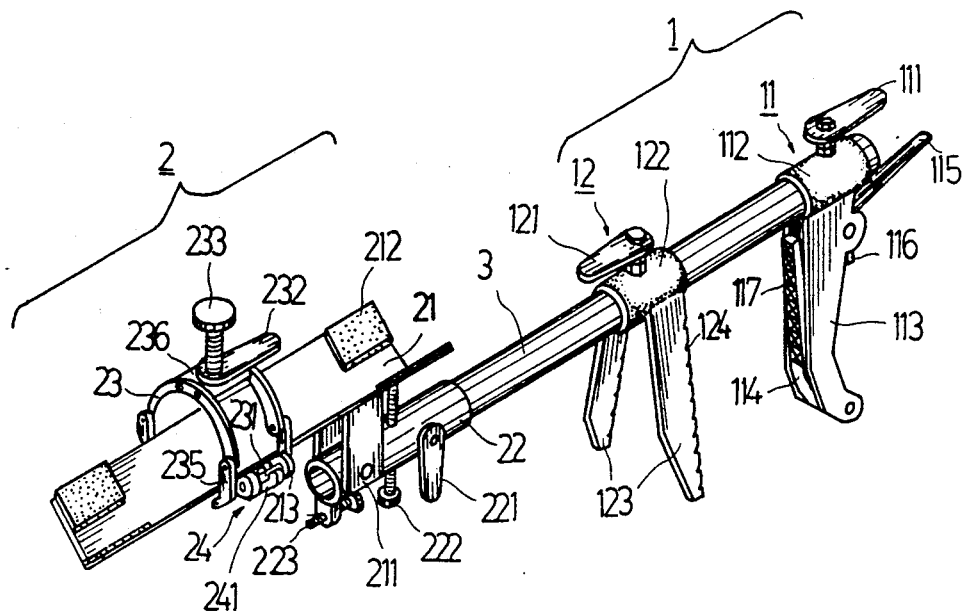
FIG. 2 is a perspective view illustrating assembly of a fishing rod adjuster assembly according to the present invention.
Figure 3:
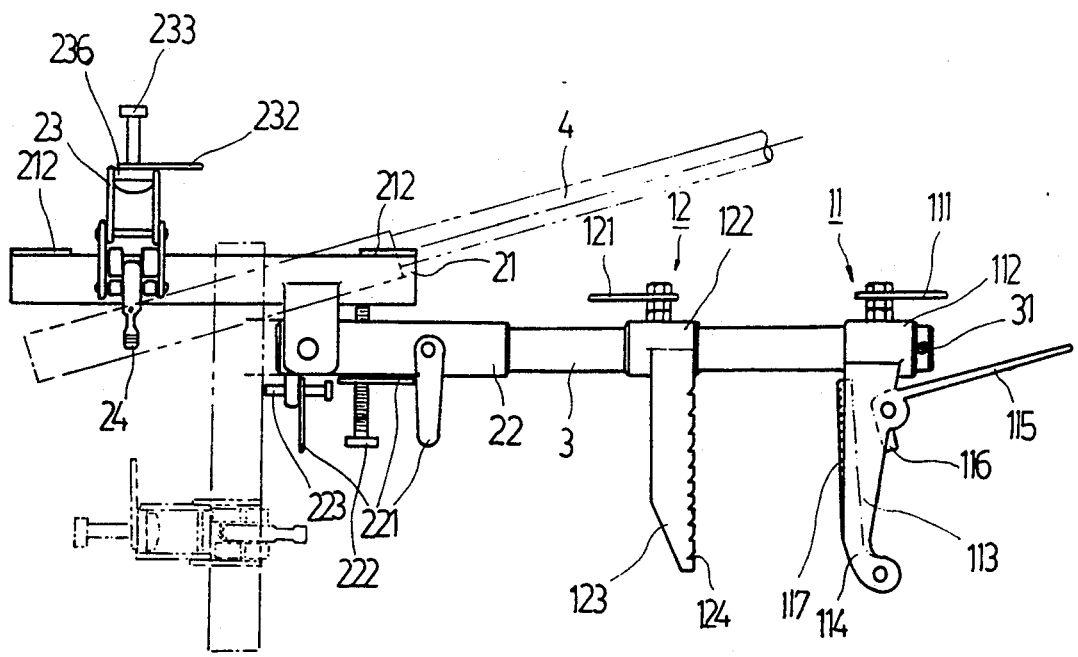
FIG. 3 is a plan illustrating the assembly shown in FIG. 2.

The rack according to the present invention is designed for locking into its working position by an instant puller, as follows:

(1) As shown in FIG. 5, the rack assembly can be tightened by downward pulling of a puller (115) and released by upward pulling of the puller (115). The pulling can position the components of the rack assembly—front adjuster (11) and back adjuster (12) immediately, and the use of cylindrical sleeves (112 and 122) with knobs (111 and 121) allows instant adjustment of distance between the rack assembly and a rod adjuster assembly, as shown in FIGS. 2 and 3.

(2) The distance between fisherman's seat and edge of hull varies from fishing boat to fishing boat, and improper adjustment of such distance will result in uncomfortable physical condition if fishing on the sea continues for a prolonged period of time. The present invention makes use of a long link which provides a large scope of adjustment for such distance, and hence the effect of human engineering can be used effectively to provide the most comfortable seat for fishing on the sea.

(3) The present invention provides a fishing rod adjuster which permits instant exchange of different fishing tackle structure, such universal head for different fishing rod and auxiliary fishing tackle with trailing wheel.

(4) As shown in FIG. 9, the auxiliary fishing tackle incorporated with a trailing wheel and a sensor unit is suitable for fishing with reverse hook on shallow sea, slow current flow or still current flow. It has the following merits: (a) it is economic; (b) it is completed with a sensor unit to monitor catching of fish, and hence the fisherman does not have to pay close attention of his fishing rod; (c) it increases the opportunity to catch fish; (d) it is easy to operate; (e) it needs only a spare rod to complete the fishing tackle; and (f) its uses a simple sensor unit which makes use of a spring to monitor fishing with a sensitivity comparable to long fishing rod.

(5) As shown in FIGS. 1 and 3, the rod adjuster assembly according to the present invention permits instant assembly, disassembly and locking of the fishing rod to a V-channel, and it permits immediate changing of fishing rod direction to adapt with current flow direction, to protect the fishing rod and fishing line, as shown in FIG. 1(b), (c) and (d).

(6) As shown in FIGS. 3 and 12, the rod adjuster assembly has a vertical adjusting screw (222) for immediate to rod direction and inclination angle so that the fishing rod is maintained at the best fishing level, and has a horizontal adjustment screw (223) to set the fishing rod to a vertical position immediately for catching of fist or upon departure of fishing boat.

(7) The V-channel (21) and the locker ring (23) according to the present invention (see FIGS. 4 and 13) permit holding of any fishing rod ranged from 2 cm to 4 cm diameter. The locker ring (23) is designed to (i) install and disassemble fishing rod instantly; and (ii) lock and secure the fishing rod firmly. The locker ring also has an adjusting screw to control a holding strip for the best possible retaining effect.

Structure and assembly of the preferred embodiments according to the present invention are described below.

As shown in FIGS. 2 and 3, the rack according to the present invention comprises a rack assembly (1), and rod adjuster assembly (2), and a link (3) for connection between them. Please refer to FIG. 5, the rack assembly (1) comprises a front adjuster (11) and a back adjuster (12) for fixing the link (3) on hull (7) or for adjustment of the link (3). On the front adjuster there is a sleeve (112) for insertion of the link (3). A handle (111) is designed on the sleeve (112) to control a screw rod penetrating into the sleeve (112) so that the screw rod can be controlled to retain the link (3) firmly. Two nuts are placed between the handled (111) and the screw rod to ease operation of the handle (111) for positioning of the screw rod. Beneath the sleeve (112) there are two side plates (113), a strap (114) is movably hinged to the bottom end of each side plate (113) at a pivot (B). On the rear side of the upper end of the strap (114) there is a corresponding puller (115) movable hinged to a block (116) at a pivot (A) so that whenever the puller (115) is moving downwards, it forces the strap (114) to displace forwards with the pivot (B) as an axis, and consequently move against the hull (7) to secure the back adjuster (12). The back adjuster (12) has a similar sleeve (122) and handle (121) with a wings (123) extending laterally beneath the sleeve (122) to act as two additional pivots when the front adjuster (11) is operated to secure to the hull (7) in order to fix the rack assembly (1) firmly. Each of the wing (123) is designed with teeth (124) and notches (117) corresponding to the strap (114) to assure firm positioning of the rack assembly (1).

At the front end of the link (3) there is a screw rod (31) penetrating into and exposed outside the link in order to retain the front adjuster (11) so that the front adjuster (11) will not be separated from the link (3). At installation of the screw rod (31), the working length of the link (3) must be ascertained first, and then the screw rod (31) is positioned by operation the handles (111 and 121) of the front and back adjusters (11 and 12) respectively.

Another end of the link (3) is fixed with the rod adjuster assembly (2). As shown in FIG. 3, the rod adjuster assembly (2) comprises a V-channel (21) for holding of a fishing rod (4), a movable locker ring (23) above the V-channel (21), an adjusting screw (233) and a knob (232) on the top of the locker ring (23), and a rubber pad (234) beneath the adjusting screw (233). For placing of the fishing rod (4) in the V-channel (21), the adjusting screw (233) is rotated to get contact with the fishing rod (4), as shown by the dash lines in FIG. 4, then knob (232) is then rotated to tighten a retaining plate (236) so that the adjusting screw (233) can retain the fishing rod (4) firmly. A rod element (231) supported by two lugs (213) is designed between the V-channel (21) and the locker ring (23), and the locker ring (23) is incorporated with a holding strip (24) to retain the rod element (231) in order to fix the locker ring (23). The holding strip (24) is movably fixed between to movable plates (235) extending from the opening of the locker ring (23), and has a hook element [241] at its front tip. Beneath the holding strip (24), an adjusting screw (242) is located corresponds to the surface of the V-channel channel (21) to assure that the holding strip (24) has retained the rod element (231) to secure the locker ring (23) at an optimal control gap, and a fixing screw (243) is located on its vertical lateral side to position the adjusting screw (242). By adjustment with the adjusting screw (242), the holding strip (24) can automatically retain the locker ring (23) at the best positioning position, and consequently the adjusting screw (23) can be easily adjusted to retain the fishing rod (4).

Two support plates (211) and extending downwards from the front end of the V-channel to movably fixed to two side of the sleeve (22) respectively. The sleeve (22) is incorporated with a knob (221) to control tightness of the link (3). A adjusting screw (222) is penetrating through the axis the sleeve (22), and another adjusting screw (223) is located beneath its rear end in horizontal direction to control the vertical and horizontal direction to control the vertical and horizontal inclination angle of the V-channel. Because the V-channel (21) is supported by the adjusting screw (22) when it is at the horizontal level, the fisherman can control its inclination angle of the V-channel by means of the adjusting screw (222) for setting the fishing rod at the most suitable operating position. The other adjusting screw (223) is for setting up the V-channel (21) vertically while withdrawing the fishing rod in the course of sailing on the sea.

Please refer to FIGS. 1, 2, 3, 4 and 5 for operation of the present invention. The front and back adjusters (11 and 12) of the rack assembly first fixed to an appropriate position on the hull (7), the link (3) is adjusted to an appropriate length, the rod adjuster assembly (2) is fixed to the link (3) and secured by turning of the knob (221). Then, the fishing rod (4) is placed in the V-channel, the locker ring (23) is placed and retained on the V-channel, and finally, the adjusting screw (233) is turned to displace the rubber pad (234) to the fishing rod, and then the knob (232) is operated to secure the fishing rod in place. If strong current is encountered, a slight turning of the knob (221) will release the sleeve (22) and then turn the V-channel so that the fishing rod and line can adapt with the current direction, as shown in FIG. 1 E, F, and G. In this way, the fishing line (42) is prevented from sudden turning at the pole connector (41), and hence it is prevented from breaking as shown by A in FIG. 1, in which the dash line shows the sudden turning of fishing line which may result in line breakage in the conventional fishing rod when strong current is encountered.

For withdrawing of the fishing rod in the course of sailing, only the V-channel (21) is required to set to a vertical position by the adjusting screw (223). As fishing rod for fishing on the sea is usually of considerable length, its center of gravity is at about ⅓ of the length from the rear end of the fishing rod, and the fishing line is subject to attraction by a magnificent sea current, the adjustment of horizontal inclination according to the present invention will not cause the V-channel (21) to lean backwards, and the V-channel (21) is still supported by the adjusting screw (222).

The fishing rod stand according to the present invention can be used with different V-channel for different fishing rod too.

As shown in FIGS. 6 and 7, another embodiment of the present invention for fishing at slow water current, such as drifting fishing line fishing. It comprises mainly a rack assembly (1), a T-sleeve (51), and a fishing rod support (53). A screw rod (31) is located at the rear end of the fishing rod support (53) to retain the fishing rod (4), and a sleeve (55) is designed beneath the fishing rod support (53) for connecting to a link (52) extending from the T-sleeve (51). The T-sleeve (51) has a handle (54) and the sleeve (55) has another handle (54) for tightness adjustment in order to control the horizontal level, height, and lateral inclination angle of the fishing rod support (53).

FIGS. 8, 9, and 10 illustrate a fishing rod stand for fishing with an auxiliary fishing tackle using a trailing wheel. Basically it comprises a rack assembly, a sleeve (64) on the link (3), two upward extending supports (64) movably fixed to a rod support (63) by means of a screw rod, and a L-sleeve (62) fixed to the rod support (63) for installation of a trailing wheel (61) by means of a link (613). The trailing wheel (61) is connected to the link (613) by its center rod (612), and has a handle (661) for controlling. The rod support (63) has a tongue element (631) at the front end to provide an appropriate travel to fishing rod (4) of different size inserted to the rod support (63), and a stopper (65) is inserted to the tongue element (631) at a position beneath the fishing rod (4) in order to secure such fishing rod (4). Such an embodiment is further incorporated with a sensor unit (67) to monitor amplitude of vibration occurred at the fishing rod whenever any fish is caught. The sensor unit (67) is composed of a pipe body (671) extending upwards from the sleeve (674) beneath the rod support (63), a spring (672) within the pipe body (671), and a retaining rod (673) keeping contact with the rod support (63), subject to the tension of the spring (672). Whenever the fishing rod is trailed by fish, the vibration of the rod support (63) causes a significant vibration by tension of the spring to indicate catching of fish. The position of the sensor unit (67) is determined by the weight of pendulum attached to the fishing rod (4) to assure occurrence of vibration at catching of fish of over a certain weight. The heavier then pendulum, the closer the sensor unit (67) to the front end of the rod support (63). This leverage principle is applied to determine the degree of sensitivity of the sensor unit (67) to meet the need for monitoring catching of fish of different weight.

The stopper (65) according to the present invention has a divergent slot (651) and a guide ring (652) at its rear end. The divergent slot (651) is designed to tighten fishing rod (4) of different size gradually, and the guide ring (65) is designed to ease removal of the stopper (65). The fishing rod stand according to the present invention provides a rapid control to fishing rod, fishing line direction and inclination angle. It is easy to operate and install. It is a convenient tool for fishing on the sea, make fishing a fun and comfortable event, and satisfy the need of fishing on the sea.

I claim:

1. A fishing rod stand for fishing on the sea comprising:
a rack assembly composed of a front adjuster and a rear adjuster for fixing to a hull, in which the front adjuster has two side plates extending beneath a sleeve, a holding strip with notches movably hinged to a pivot, and a puller movable fixed to a block at another side of the holding strip, and the rear adjuster has two wings with teeth extending downward from two lateral sides of a sleeve;
a rod adjuster assembly composed of a V-channel for holding a fishing rod with a rubber pad at its front end and another rubber pad at its rear end, a locker ring, and two supports extending from the front end of the V-channel and movably fixed to a sleeve with a horizontal adjusting screw and a vertical adjusting screw to keep the V-channel in an adjustable horizontal inclination angle or to position the V-channel in an upright position, in which the V-channel is incorporated with a movable locker ring in the middle having two movable plates and a movably fixed holding strip with a hook element for opening the locker ring, an adjusting screw at the end of said strip opposite the hook element to adjust the gap between the holding strip and the V-channel, a screw in the perpendicular direction to fix the said adjusting screw, a rod above the V-channel corresponding to the hook element of the holding strip to retain the locker ring when the hook element is engaged, and the locker ring is incorporated with an adjusting screw on the top, a rubber pad to act against the fishing rod, and a knob on the adjusting screw to position the adjusting screw;

a link with a screw penetrating through its front end to retain and hold the rack assembly firmly, a sleeve for the rod adjuster assembly for different fishing rod or auxiliary fishing tackle, in which the sleeve has a screw to control tightness of the link by adjustment of a knob;

whereby the front and rear adjusters of the rack assembly are arranged to adjust the link to a desired length for fixing to a hull, and then the rod adjuster assembly is fixed by engagement of the locker ring and the holding strip which can be done simply and quickly.

2. A fishing rod stand for fishing on the sea as claimed in claim 1 wherein a screw rod support to retain the fishing rod is mounted below the V-channel and an L-link is mounted on the link to connect to a T-sleeve on said link.

3. A fishing rod stand for fishing on the sea as claimed in claim 1 wherein the auxiliary fishing tackle comprises
a trailing wheel;
a L-sleeve to hold the trailing wheel with a support perpendicular thereto;
a rod support with a tongue element at the front end to provide adjustable gap after engagement with a fishing rod;
a stopper with divergent slot for inserting to the gap between the fishing rod and the tongue element in order to tighten the fishing rod;
a sleeve fixed to the link, having two lateral supports extending upwards to connect to the rear end of the said rod support; and
a sensor unit located on the link and beneath the rod support, having an upward extending pipe body with a spring therein and a retaining rod so that the spring is kept supporting the retaining rod to contact with the rod support, and to provide a vertical vibration when the rod support is subject to pulling of fish being caught upon the tension of the spring and the leverage at different contacting position.

* * * * *